(12) United States Patent
Degner et al.

(10) Patent No.: US 11,444,497 B2
(45) Date of Patent: Sep. 13, 2022

(54) STATOR FOR ELECTRIC MACHINE WITH MULTI-PART CONDUCTOR ASSEMBLY

(71) Applicant: Ford Global Technologies, LLC, Dearborn, MI (US)

(72) Inventors: Michael W. Degner, Novi, MI (US); Franco Leonardi, Dearborn Heights, MI (US); Becky Sue Morris, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/786,138

(22) Filed: Feb. 10, 2020

(65) Prior Publication Data

US 2021/0249915 A1 Aug. 12, 2021

(51) Int. Cl.
*H02K 1/16* (2006.01)
*H02K 3/28* (2006.01)
*H02K 15/02* (2006.01)
*H02K 3/50* (2006.01)
*H02K 3/12* (2006.01)

(52) U.S. Cl.
CPC .............. *H02K 1/165* (2013.01); *H02K 3/12* (2013.01); *H02K 3/28* (2013.01); *H02K 3/50* (2013.01); *H02K 15/024* (2013.01)

(58) Field of Classification Search
CPC ............ H02K 1/165; H02K 3/12; H02K 3/28; H02K 3/50
See application file for complete search history.

(56) References Cited

U.S. PATENT DOCUMENTS

| | | | | |
|---|---|---|---|---|
| 3,185,872 A * | 5/1965 | Weissheimer | ........... | H02K 3/14 310/213 |
| 6,147,432 A * | 11/2000 | Kusase | .................... | H02K 3/50 310/179 |
| 6,181,043 B1 * | 1/2001 | Kusase | .................... | H02K 3/12 310/180 |
| 6,469,413 B1 * | 10/2002 | Oohashi | ................. | H02K 11/05 310/184 |
| 6,661,146 B2 * | 12/2003 | Oohashi | ................... | H02K 3/50 310/180 |

(Continued)

FOREIGN PATENT DOCUMENTS

EP 2606561 B1 10/2014

*Primary Examiner* — Robert W Horn
(74) *Attorney, Agent, or Firm* — David B. Kelley; Brooks Kushman P.C.

(57) ABSTRACT

A stator for an electric machine is fabricated by assembling a core and first and second winding assemblies. The first winding assembly (FWA) is fabricated by a 3D printing process and includes a plurality of U-shaped conductors (hairpins) having respective end-turns arranged in mutually axially-nested relationship to each other to form a ring, and further having two uprights disposed in one of the slots of the core. End-turns connect respective pairs of the uprights and are disposed adjacent to an end surface of the core, distal ends of the uprights projecting axially beyond an opposite end surface of the core. The second winding assembly (SWA) includes a plurality of bridges forming a second ring Opposite ends of each bridge define terminals that mate with ends of the uprights. The SWA further includes an electrically non-conductive casing in which at least one of the bridges is embedded.

14 Claims, 11 Drawing Sheets

(56) References Cited

U.S. PATENT DOCUMENTS

| | | | | |
|---|---|---|---|---|
| 6,870,294 B2* | 3/2005 | Holzheu | .................. | H02K 3/12 |
| | | | | 310/201 |
| 7,476,997 B2* | 1/2009 | Grundl | .................... | H02K 3/12 |
| | | | | 310/179 |
| 7,723,879 B2* | 5/2010 | Fujii | ........................ | H02K 3/12 |
| | | | | 310/71 |
| 9,118,224 B2* | 8/2015 | Okimitsu | .................. | H02K 3/12 |
| 10,630,127 B1* | 4/2020 | Thomasson | .............. | H02K 3/38 |
| 10,923,978 B2* | 2/2021 | Shiah | ........................ | H02K 3/12 |
| 11,075,560 B2* | 7/2021 | Matsumoto | .............. | H02K 1/16 |
| 2003/0214190 A1* | 11/2003 | Congdon | ........... | H02K 15/0081 |
| | | | | 310/71 |
| 2015/0076951 A1 | 3/2015 | Lynch et al. | | |
| 2016/0285334 A1 | 9/2016 | Turnbull et al. | | |
| 2017/0040859 A1* | 2/2017 | Langlard | ................... | H02K 3/28 |
| 2018/0152069 A1* | 5/2018 | Roer | ........................ | H02K 3/30 |
| 2018/0205285 A1 | 7/2018 | Huang et al. | | |
| 2018/0309337 A1* | 10/2018 | Lee | ........................ | H02K 3/12 |
| 2020/0044495 A1* | 2/2020 | Hattori | ................... | H02K 1/148 |
| 2020/0067362 A1* | 2/2020 | Shiah | ........................ | H02K 3/28 |
| 2020/0169151 A1* | 5/2020 | Hashimoto | ........ | H02K 15/0428 |
| 2020/0169152 A1* | 5/2020 | Matsumoto | ........ | H02K 15/0081 |
| 2020/0195108 A1* | 6/2020 | Yamaji | ..................... | H02K 3/28 |
| 2020/0204028 A1* | 6/2020 | Mizushima | .............. | H02K 3/28 |
| 2020/0220411 A1* | 7/2020 | Kim | ........................ | H02K 3/50 |
| 2020/0280234 A1* | 9/2020 | Dunn | ........................ | H02K 3/521 |
| 2020/0287434 A1* | 9/2020 | Dunn | ........................ | H02K 3/28 |
| 2020/0295633 A1* | 9/2020 | Hendricks | .............. | H02K 11/33 |
| 2021/0091619 A1* | 3/2021 | Schweinert | .............. | H02K 3/24 |
| 2021/0152043 A1* | 5/2021 | Leonardi | ................... | H02K 3/12 |
| 2021/0249915 A1* | 8/2021 | Degner | .................... | H02K 3/28 |

* cited by examiner

STATOR FOR ELECTRIC MACHINE WITH MULTI-PART CONDUCTOR ASSEMBLY

TECHNICAL FIELD

This disclosure relates to the field of electric machines. More particularly, the disclosure pertains to a stator having a winding that comprises two or more separately fabricated sub-assemblies.

BACKGROUND

Electric machines (motors, generators, etc.) are comprised of several fundamental components that are common to many different types of machines: one or more current carrying components (the conductors or winding); a magnetic path component (the core); and a magnetic field source (one or more coils or magnets). In typical motors, including those currently employed in most electric vehicles, the stator includes windings comprising a plurality of straight portions extending axially through the core (usually passing through slots defined by the core), and a plurality of portions outside of and at each axial end of the core, generally referred to as end-turns. The end-turns electrically connect the axially oriented conductors inside slots defined by the core thereby completing the electrical circuit and creating the desired/required number of electric phases. Although necessary for the correct functioning of the machine, the end-turn region contributes to electrical losses, weight, cost, and volume but not to torque. It is therefore desirable to reduce the length and electrical resistance of the end-turns.

It is conventionally known to manufacture the stator of an EM by inserting U-shaped "hairpin conductors" into axially-extending slots formed in the stator from a first axial end of the stator and subsequently inter-connecting the ends of the hairpins projecting from the opposite second axial end of the stator as necessary to achieve the desired circuit path. Each hairpin conductor is conventionally fabricated by bending a copper rod or bar with rectangular cross section. As a result, the shape and area of the conductor cross section remains the same throughout the machine. The end-turns must cross axially over one another at both ends of the stator, and this adds to the overall length of the windings. The end-turns may therefore comprise a significant portion of the total winding length that in short stack machines (defined as machines where the radius is much larger that the axial length) can reach 50% of the total copper content.

Configurations have been suggested that allow electrical machine components to be produced by additive manufacturing, also commonly known as three-dimensional (3D) printing. None of the proposed configurations, however, have enabled the manufacture of a distributed winding stator in which the end-turns do not cross axially over one another. Eliminating such cross-overs would result in a significantly improved machine.

SUMMARY OF THE DISCLOSURE

In a first disclosed structural embodiment, a stator for an electric machine comprises a core defining a plurality of slots extending parallel to a longitudinal axis of the core and stratified layers arranged to form a first winding assembly comprising a plurality of U-shaped conductors each comprising first and second uprights disposed in a different one of the slots. The first winding assembly further comprising a plurality of end-turns connecting respective pairs of the first and second uprights and disposed adjacent to a first end surface of the core, ends of the uprights distal from the end-turns defining first terminals projecting axially beyond a second end surface of the core. A second winding assembly comprises a plurality of bridges, each having opposite ends defining second terminals configured for mating engagement with respective first terminals, one of the first and second terminals being inserted into an other of the first and second terminals.

According to another feature disclosed herein, the plurality of bridges may be disposed in a ring and the second winding assembly may further comprise an electrically non-conductive casing enclosing the ring on a circumferentially outer surface thereof and on a radially inner surface thereof.

At least one of the first terminals comprises a tenon and the respective one of the second terminals engaged therewith may comprises a mortise such that at least one of the bridges is coupled to respective upright by a mortise-and-tenon joint. Alternatively, the first and second terminals may be coupled with one another by a tongue-and-groove joint, or by a butt-type joint.

In a further feature of the stator disclosed herein, the first upright is radially closer to the longitudinal axis than the second upright, and radially adjacent end-turns are disposed in radially-nested relationship with one another without crossing over one another.

According to another aspect disclosed herein, the first winding assembly further comprises a plurality of U-shaped outer conductors each comprising a third upright disposed in a third of the slots, a fourth upright disposed in a fourth of the slots, and an outer end-turn connecting the third and fourth uprights and extending axially over and spanning the end-turn of a one of the conductor, with ends of the third and fourth uprights distal from the outer end-turns defining third terminals. The stator further comprises a third winding assembly comprising a plurality of inner bridges and that is disposed axially between the core and the second winding assembly such that each of the bridges extends axially over and spans a respective one of the inner bridges. Each of the inner bridges has opposite ends defining fourth terminals that mating engage respective ones of the third terminals, and the third winding assembly defines a plurality of holes through which respective ones of the first and second uprights extend.

In yet another feature disclosed herein, a stator for an electric machine comprises a core defining a plurality of slots extending parallel to a longitudinal axis of the core, and stratified layers are arranged to form a first winding assembly comprising a plurality of U-shaped conductors having respective end-turns arranged in mutually radially-nested relationship to each other to form a ring. Each U-conductor further comprises two uprights disposed in a different one of the slots, and the first winding assembly further comprises a plurality of end-turns connecting respective pairs of the uprights and disposed adjacent to a first end surface of the core, ends of the uprights distal from the end-turns defining first terminals projecting axially beyond a second end surface of the core. A second winding assembly comprises a plurality of bridges arranged in mutually radially-nested relationship to each other to form a second ring, and opposite ends of each bridge define terminals configured for mating engagement with respective first terminals, and the second winding assembly further comprises an electrically non-conductive casing with at least one of the plurality of bridges embedded in the casing. The casing is disposed adjacent to a second end surface of the core to place the second terminals in engagement with the respective first terminals.

The first winding assembly may further comprise a plurality of U-shaped outer conductors each comprising a third upright disposed in a third of the slots, a fourth upright disposed in a fourth of the slots, and an outer end-turn connecting the third and fourth uprights and disposed in a ring-shaped, mutually radially-nested radially with one another, and ends of the third and fourth uprights distal from the outer end-turns defining third terminals. The stator further comprises a third winding assembly comprising a plurality of inner bridges disposed in a third ring partially enclosed in an electrically non-conductive casing, the third winding assembly disposed axially between the second end of the core and the second winding assembly such that each of the bridges extends axially over and spans a respective one of the inner bridges. Each of the inner bridges has opposite ends defining fourth terminals configured for mating engagement with respective third terminals, one of the third and fourth terminals being inserted into an other of the third and fourth terminals. The third winding assembly defines a plurality of holes through which respective ones of the first and second uprights extend.

In a further disclosed feature, a method of manufacturing a stator for an electric machine comprises forming a core defining a plurality of slots extending parallel to a longitudinal axis of the core, and arranging stratified layers to form a first winding assembly comprising a plurality of U-shaped conductors each having an end-turn with an upright extending from opposite ends thereof. In a first assembly step, the first winding assembly is inserted into mating engagement with the core such that the end-turns are adjacent to a first axial end of the core and the uprights are disposed in respective slots and first terminals defined at ends of the uprights distal from the respective end-turns project axially beyond a second axial end surface of the core. A second winding assembly is formed to comprise a plurality of bridges, opposite ends of the bridges comprising second terminals for mating engagement with respective ones of the first terminals. In a second assembly step, the second winding assembly is positioned adjacent to the second end surface of the core such that one of the first and second terminals is inserted into an other of the first and second terminals.

In a further feature of the disclosed fabrication method, stratified layers are arranged such that the first winding assembly further comprising a plurality of U-shaped outer conductors each comprising an outer end-turn with an outer upright extending from opposite ends thereof, with each outer end-turn extending axially over and spanning the end-turn of a respective one of the conductors, whereby the mating of the first winding assembly with the core places the outer uprights in respective slots and third terminals defined at ends of the outer uprights distal from the respective outer end-turns project axially beyond the second axial end surface of the core a shorter distance than the first terminals. A third winding assembly comprises a plurality of inner bridges having opposite ends comprising fourth terminals for mating engagement with respective ones of the third terminals, and the third winding assembly defining a plurality of holes. Prior to the step of placing of the second winding assembly, the third winding assembly adjacent is placed adjacent to the second end surface of the core such that the third terminals engage respective fourth terminals and the uprights extend through respective holes. The subsequent placing of the second winding assembly then places the second winding assembly bridges in axially spanning positions over the respective inner bridges.

DETAILED DESCRIPTION

Figure 1:
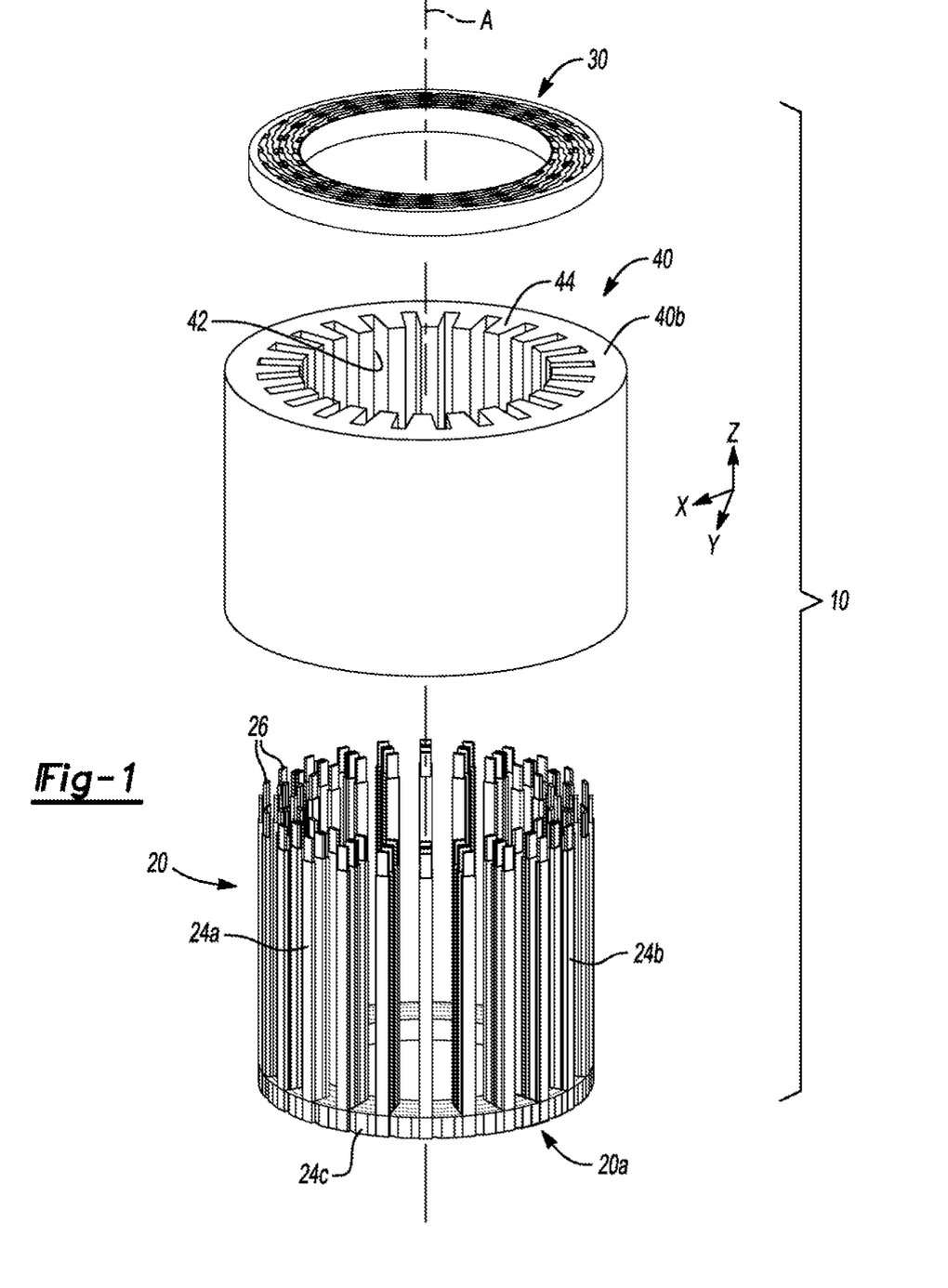
FIG. 1 is a perspective exploded view of portions of major components of a stator of an electric machine.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular As seen in the exploded view of FIG. 1, a stator 10 exhibiting features of the invention comprises a first winding assembly (FWA) 20, a second winding assembly (SWA) 30, and a core 40. Longitudinal or central axis A indicates the axis of radial symmetry of stator 10 and is also the axis-of-rotation of a generally cylindrical rotor (not shown) that, in an assembled electric machine, is supported within the stator for rotation relative thereto Stator core 40 is generally conventional in configuration and defines a plurality of axially extending slots 42 separated by teeth 44. Core 40 is composed of a ferrous material such as iron or steel and may be fabricated as a unitary component or as a stack of thin layers.

FWA 20 comprises a plurality of U-conductors 24 (which may alternatively be referred to as "hairpins" by persons of skill in the art) each of which comprises two parallel uprights 24a, 24b and an end-turn 24c extending between, connecting, and formed integrally with the uprights. U-conductors 24 are arranged such that radially-adjacent pairs of end-turns 24c are in a radially-nested relationship with one another to form an annular disk or ring 20a laying in the x-y plane indicated in FIG. 1 and uprights 24a, 24b extend parallel to central axis A and to the z-axis. The free ends of uprights 24a, 24b distal from their respective end-turns 24c comprise terminals 26 as further described below.

Figure 2:
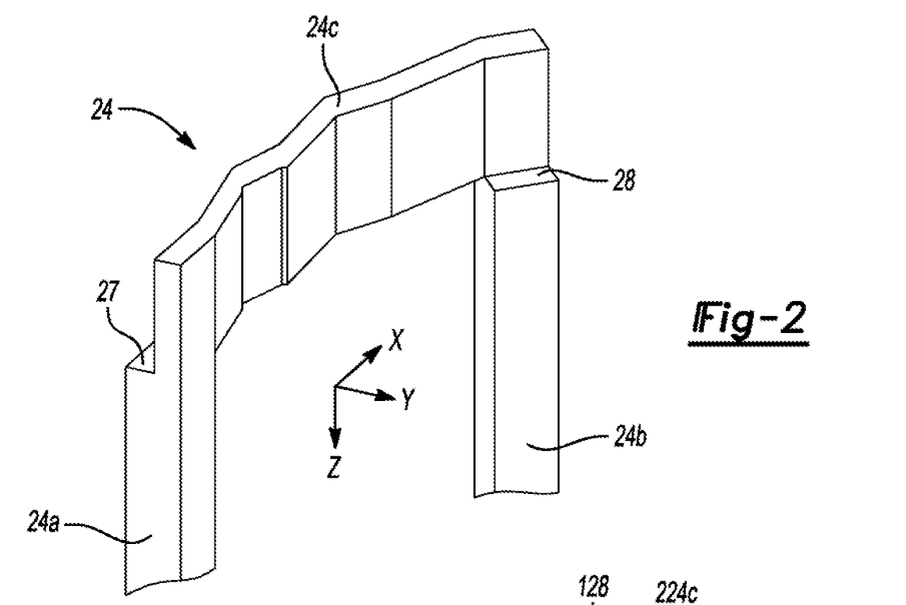
FIG. 2 is a partial perspective view showing a representative U-conductor of the first winding assembly shown in FIG. 1.

To enable the radially-nested relationship of U-conductors 24, end-turns 24c and the portions of uprights 24a, 24b immediately adjacent thereto may be configured as shown in FIG. 2. A first end of end-turn 24a is connected to a radially inner portion of first upright 24a such that the junction between the end-turn and the first upright is configured to define a radially outward-facing ledge 27, and a second end of the end-turn is connected to a radially outer portion of the second upright 24b such that the junction between the end-turn and the second upright is configured to define a radially inward-facing ledge 28. Upright 24a is relatively more radially inward in comparison to upright 24b. Consequently end-turn 24c steps radially outward as it extends clockwise, as viewed in FIG. 2, about the central axis A of SWA 30.

Figure 3:
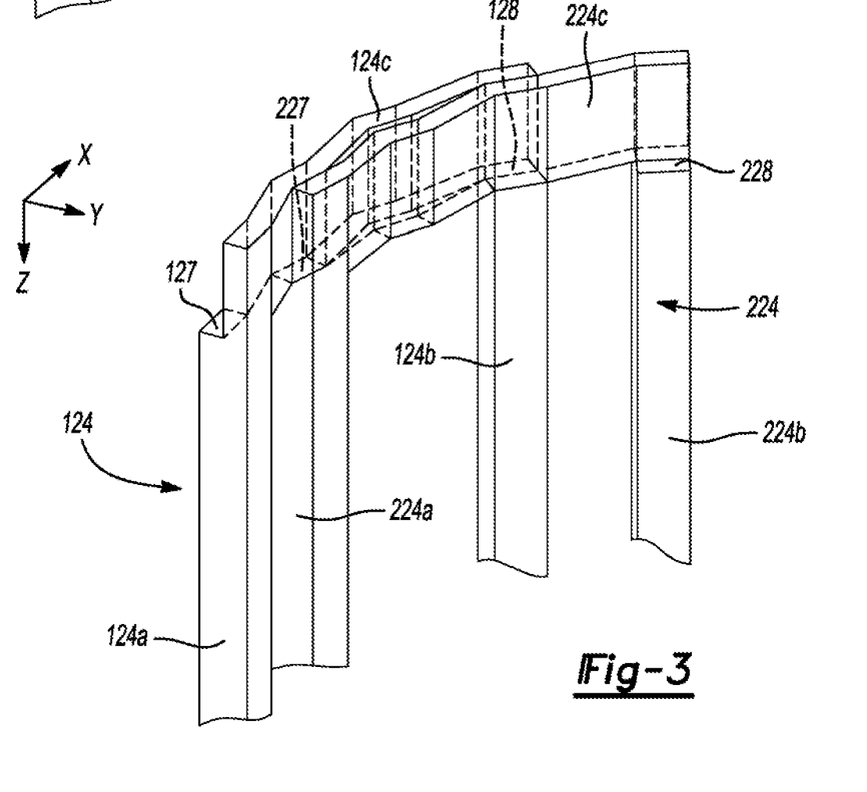
FIG. 3 is a partial perspective view of two radially adjacent conductors shown in FIG. 2, in isolation from the core and other conductors.

The nested relationship between radially-adjacent U-conductors is best seen in FIG. 3, in which two representative U-conductors 124, 224 are shown isolated from the rest of conductors making up FWA 20. The two representative U-conductors shown may be any pair of radially-adjacent U-conductors which compose FWA 20. As shown, the following relationships exist: 1) The end-turn of a radially outer U-conductor 124 lies in and passes over the outward-facing ledge 227 of a radially inner conductor 224; and 2) The end-turn of the radially inner conductor 224 passes over and lies in the inward-facing ledge 128 of the radially outer conductor 124. As this closely-nested relationship between each pair of radially-adjacent U-conductors 124, 224 is repeated around the circumference and across the radius of ring 20a, the requirement (which exists in prior art winding designs) for end-turns of the U-conductor to cross axially over one another is avoided.

As compared with a conventionally-known stator in which the end-turns of conductors cross over (overlap) one another at the axial ends of the core, the disclosed radially-nested configuration allows for conductors to be shorter in total length and therefore use less material and produce less electrical resistance. Further, the disclosed stator (and hence the electrical machine overall) may be more axially compact than is known in the prior art.

Figure 4:
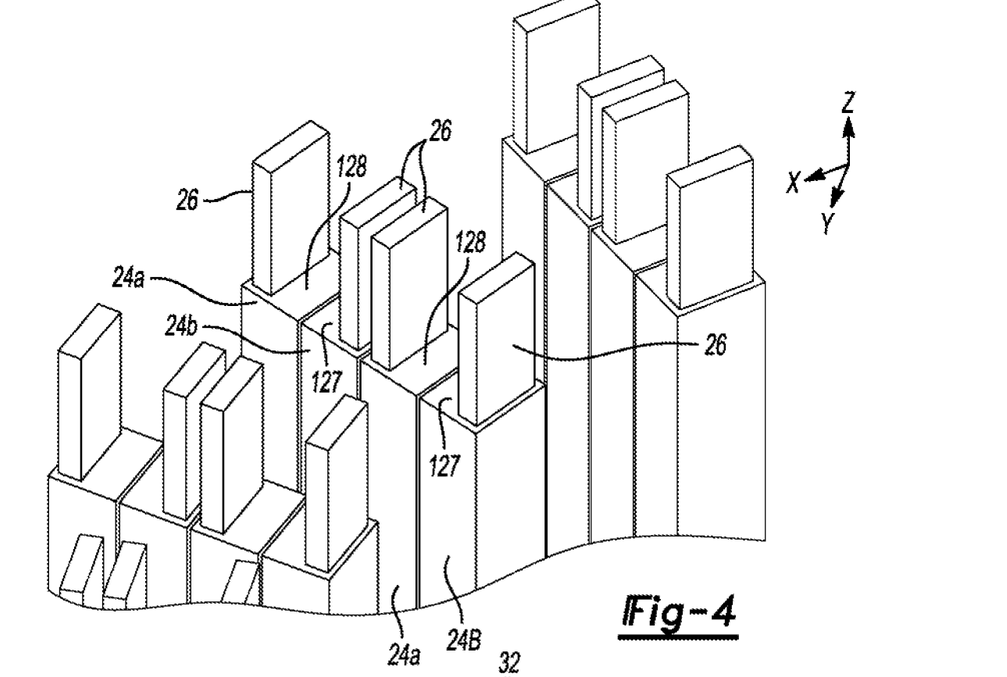
FIG. 4 is a partial perspective view of the first winding assembly of FIG. 1.

As best seen if FIG. 4, the distal ends of uprights immediately adjacent to terminals 26 are configured to form outward-facing ledges 127 and inward-facing ledges 128 similar to the ledges 27, 28 shown in FIGS. 3 and 4. Ledges 127, 128 allow elements of SWA 30 to mate with terminals 26 in a radially-nested fashion, as described further below.

U-conductors 24 are formed of material having a high electrical conductivity (such as copper) and are covered by a non-conductive coating so as to be electrically insulated from one another (and from core 40 when assembled therewith). Because the insulating coating is very thin relative to the size of the conductors it is not shown in the figures or identified by a reference number.

FWA 20 may advantageously be formed using an additive manufacturing process (also known as three-dimensional or 3D printing) wherein stratified layers of material are deposited in sequence on top of one another. Such a process may allow U-conductors 24 to be printed simultaneously with one another and with the end-turns 24c thereof arranged in the radially-nested relationship shown. The 3D printing process further allows the fabrication of end-turns that vary in cross-sectional shape and/or are over their respective lengths. A thin insulating layer (not shown) surrounding the U-conductors 24 may also be formed simultaneously by such a process.

The disclosure contained herein related to the fabrication, configuration, and mutually-nested arrangement of end-turns 24c as shown in FIGS. 3 and 4 is also disclosed in co-pending U.S. patent application Ser. No. 16/685,029 filed on Nov. 15, 2019, the disclosure of which is hereby incorporated in its entirety by reference.

SWA 30 (see FIG. 5) comprises a plurality of electrically conductive bridges 32 configured substantially similar to end-turns 24c and arranged in a mutually radially-nested relationship substantially similar to that of ring 20a. When in the radially-nested arrangement, bridges 32 are electrically insulated from one another, for example by thin dielectric coatings, as described above in relation to U-conductors 24.

Figures 6, 7, 8:
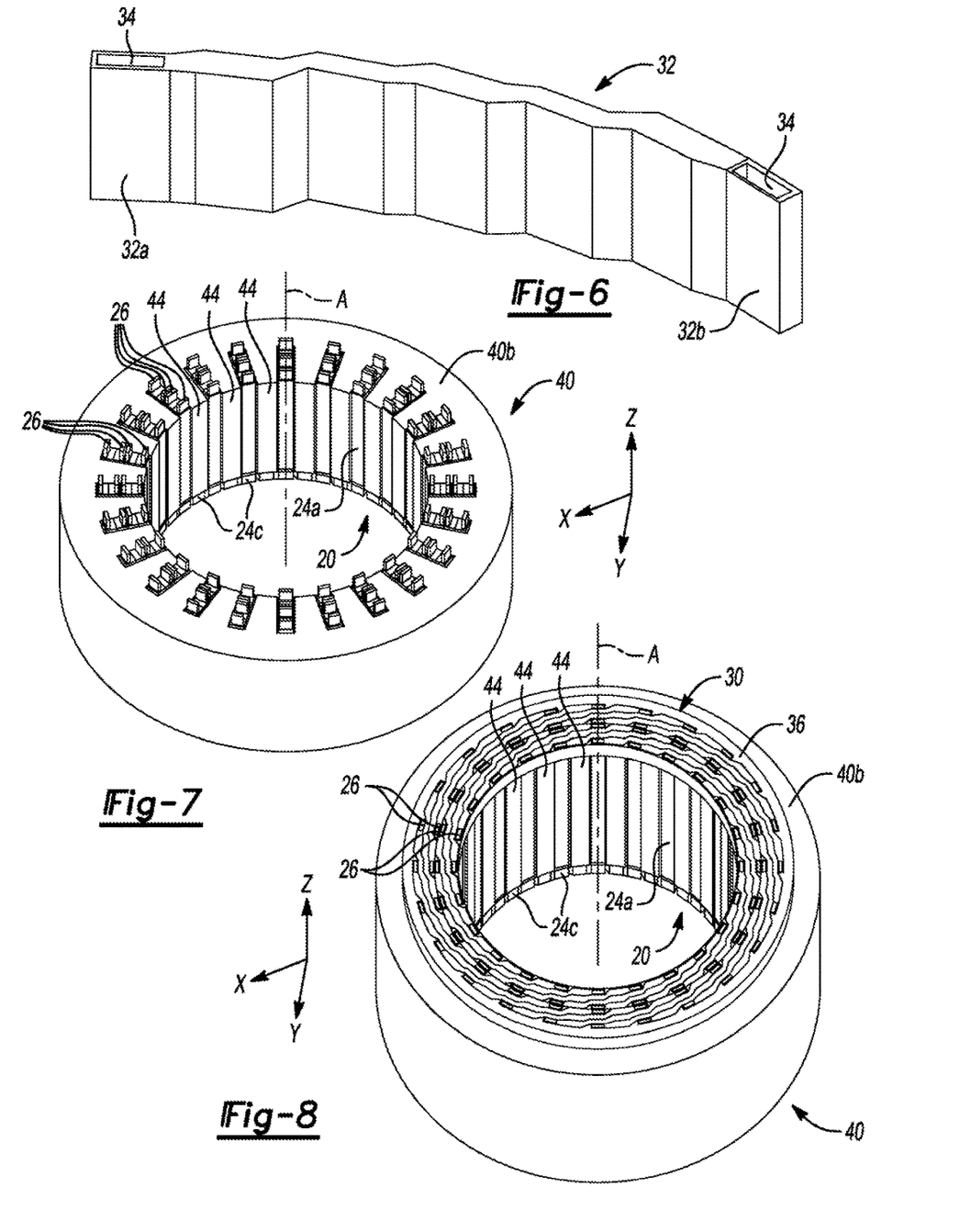
FIG. 6 is a perspective view of a representative bridge of the second winding assembly of FIGS. 1 and 5.
FIG. 7 is a perspective view of the core and first winding assembly of FIG. 1 after a first assembly step.
FIG. 8 is a perspective view of the core, first winding assembly, an second assembly of FIG. 1 after a second assembly step.

A representative one of the bridges 32 is shown in FIG. 6 to have opposite ends defining respective second terminals 32a, 32b that are configured for mating electrical connection to respective first terminals 26. In the embodiment of FIG. 6, second terminals 32a, 32b define generally rectangular openings 34 adapted to receive first terminals 26 therein.

Figure 5:
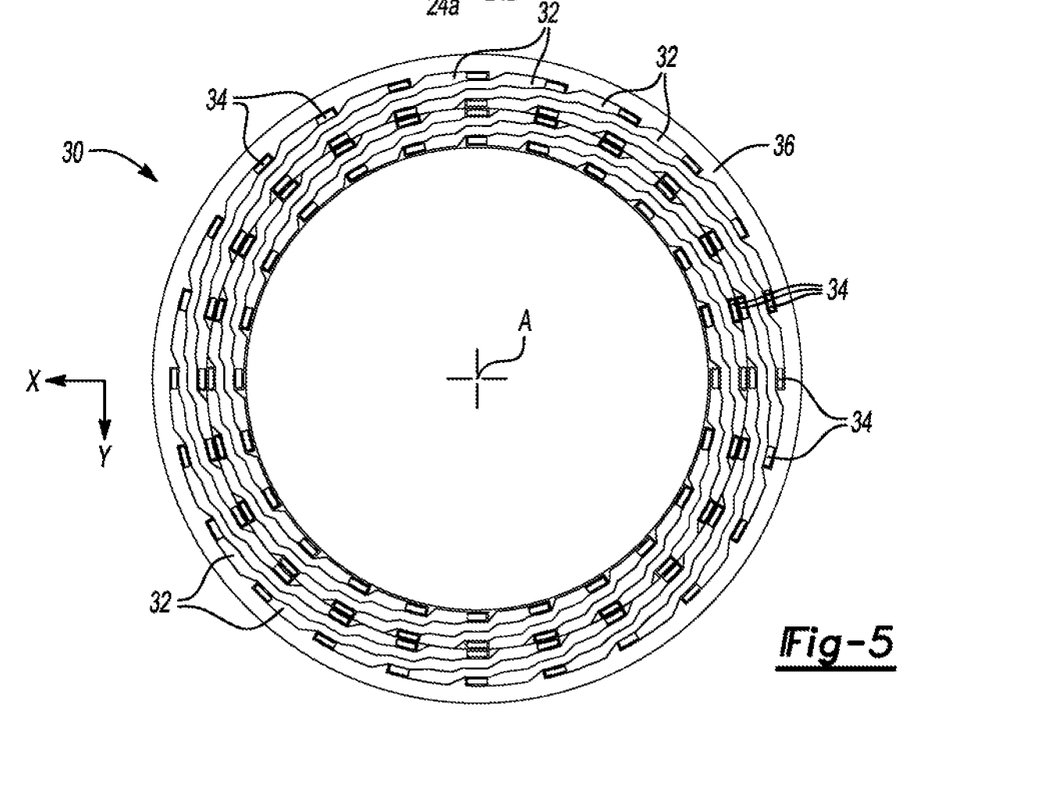
FIG. 5 is a plan view of the second winding assembly of FIG. 1.

SWA 30 may further comprise a casing 36 partially enclosing the ring formed by nested bridges 32 and holding the bridges together in a unitary, rigid disk. In the embodiment shown, casing 36 encloses the ring of nested bridges 32 on the circumferentially outer surface and on the radially inner surface thereof. Casing 36 is formed of an electrically non-conductive material such as epoxy and may be formed by an over-molding process after bridges 32 have been arranged in their ring-shaped, mutually nested relationship. Casing 36 may fill any gaps or spaces that may exist between adjacent bridges 32.

As also shown in FIG. 6, bridges 32 may vary in width along their circumferential lengths/spans. Specifically, the portions of the bridge that (when SWA 30 is assembled with FWA 20 and core 40, as described below) pass over (directly axially above) the teeth 44 separating slots 42 are greater in radial width than the adjacent portions of the bridge passing over the slots. This length-wise variation of the radial widths of the bridges is also enabled by a 3D printing process. This width variation may also be present in end-turns 24c, as disclosed in co-pending U.S. patent application Ser. No. 16/685,029.

Referring now to FIG. 7, in a first stator assembly step, FWA 20 is inserted axially into core 40 such that ring 20a formed by end-turns 24c is closely adjacent to or contacting a first end surface of the core (the far end of the core, not visible in FIG. 7) and uprights 24a, 24b are disposed in respective slots 42. First terminals 26 at the distal ends of the uprights project axially beyond a second end surface 40b of the core.

The uprights 24a, 24b of each U-conductor are disposed in respective slots separated by one or more intervening slots which are spanned by end-turns 24c. The number of intervening slots spanned by an end-turn 24c is dictated by several design features of the electrical machine (the number of electrical phases and the number of slots-per-pole, for example). In the depicted embodiment showing a three-phase, three slots-per-pole stator, wherein each end-turn 24c spans two intervening slots. The disclosed design concepts may be applied to electric machines having configurations different from this embodiment.

In a second assembly step, SWA 30 is positioned in axial alignment with the combined FWA 20 and core 30 and moved relative to those components along axis A so that first terminals 26a, 26b of each U-connector are brought into engagement with their respective second terminals 32a, 32b (FIG. 8). Comparing FIGS. 5 and 7 with one another, it is apparent that this engagement is enabled by the number and locations of first terminals 26 corresponding to the number and locations of openings 34 defined by each of bridges 32. At the conclusion of the second assembly step, bridges 32 are closely adjacent to or contacting (but, due to their dielectric coatings, electrically insulated from) core 40.

In an alternative embodiment of a second assembly step, the bridges 32 may be placed in engagement with their respective first terminal 26a, 26b individually or in a plurality of groups, rather than first being formed into a unitary SWA as described above. In this care, each group may comprise any number of bridges less than the total number included in SWA 30. In this embodiment, the casing may be dispensed with completely or the casing may be over-molded onto the ring-shaped array of bridges after it is assembled to the FWA. In another alternative, groups of any number of bridges 32 may be enclosed by insulating casings to form multiple sub-units that are then assembled to the FWA.

Figure 9A:
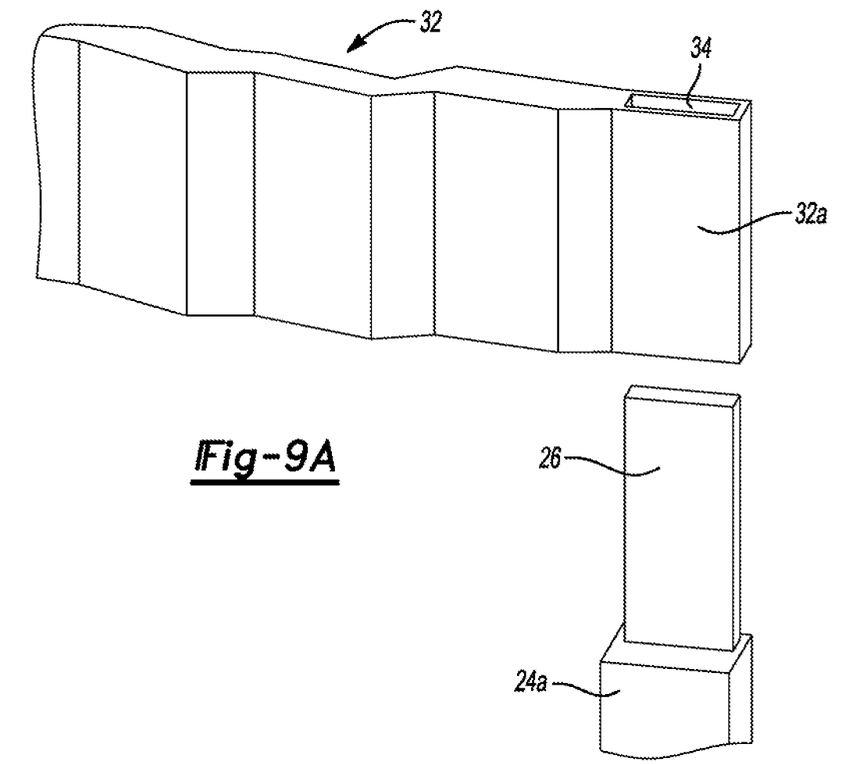
FIG. 9A is a perspective view of terminal portions of a first disclosed embodiment of a bridge and mating U-conductor prior to being connected with one another.
Figure 9B:
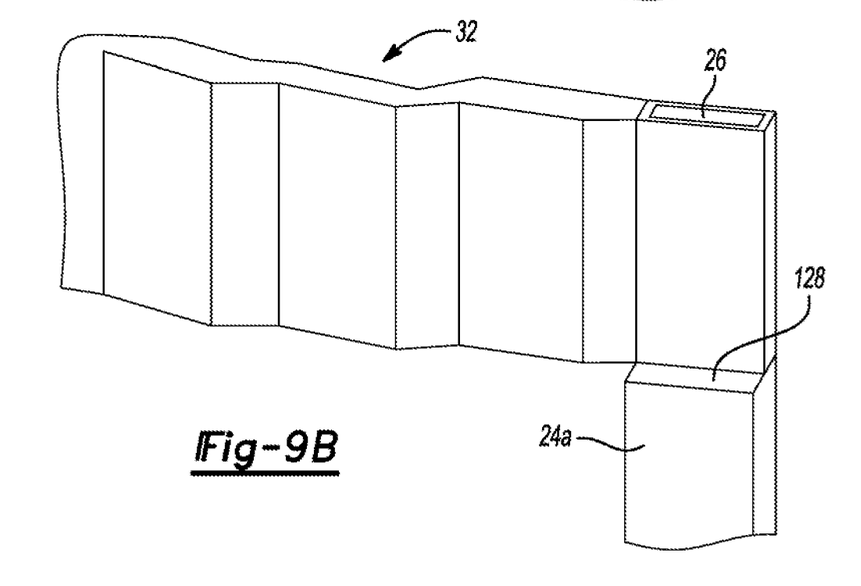
FIG. 9B is a perspective view of the terminal portions of FIG. 9A after being connected with one another.
Figure 9C:
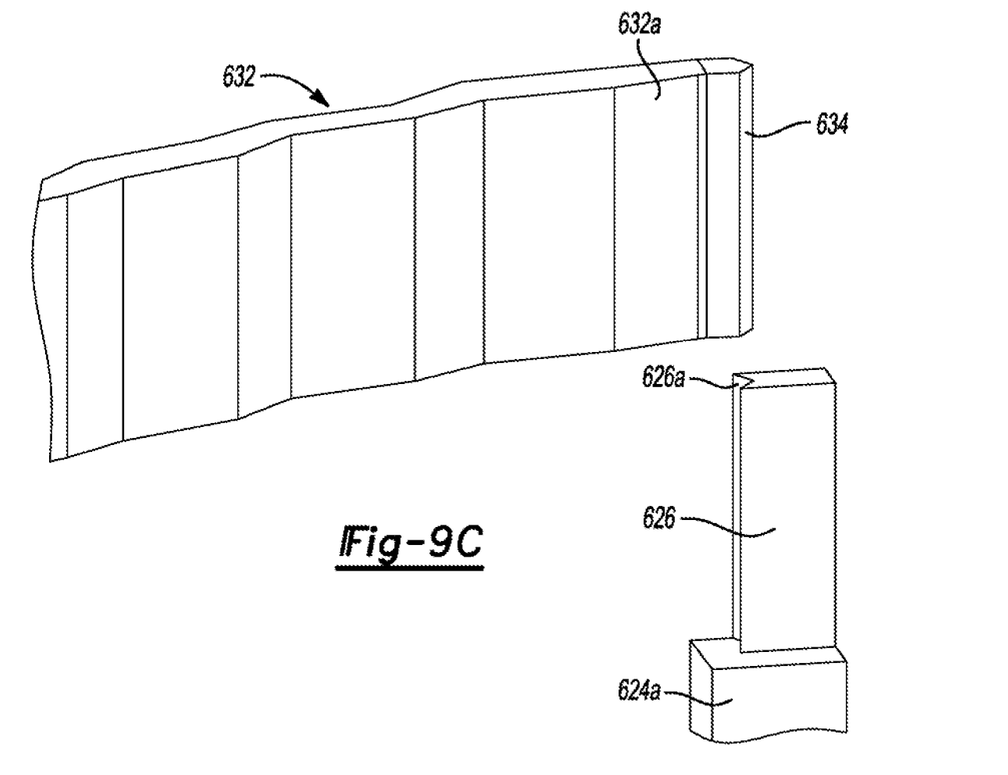
FIG. 9C is a perspective view of terminal portions of a second disclosed embodiment of a bridge and mating U-conductor prior to being connected with one another.
Figure 9D:
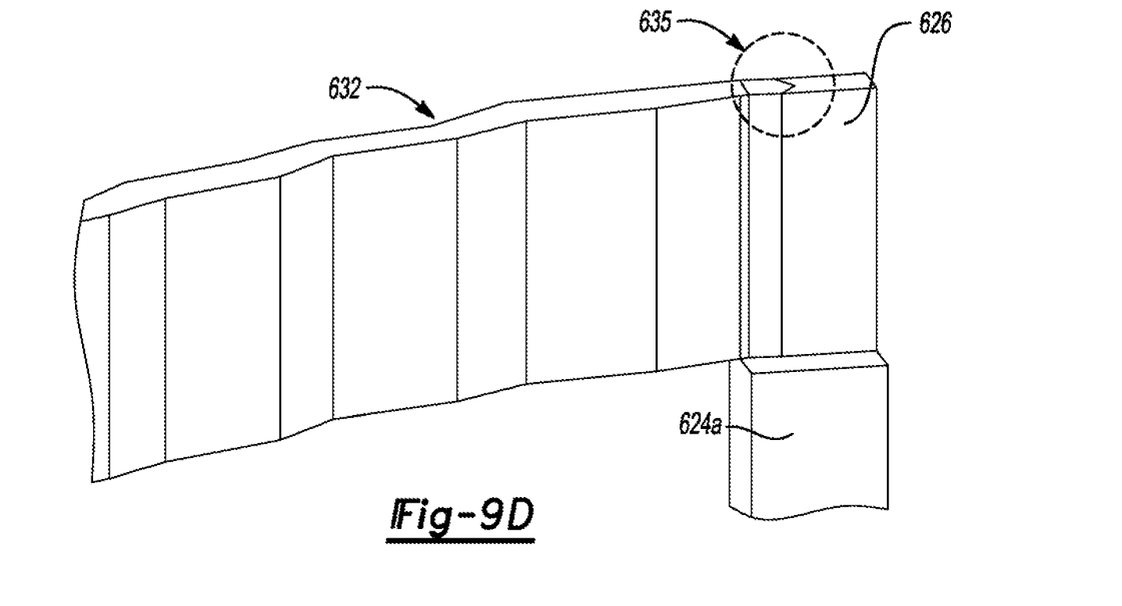
FIG. 9D is a perspective view of the terminal portions of FIG. 9C after being connected with one another.
Figure 9E:
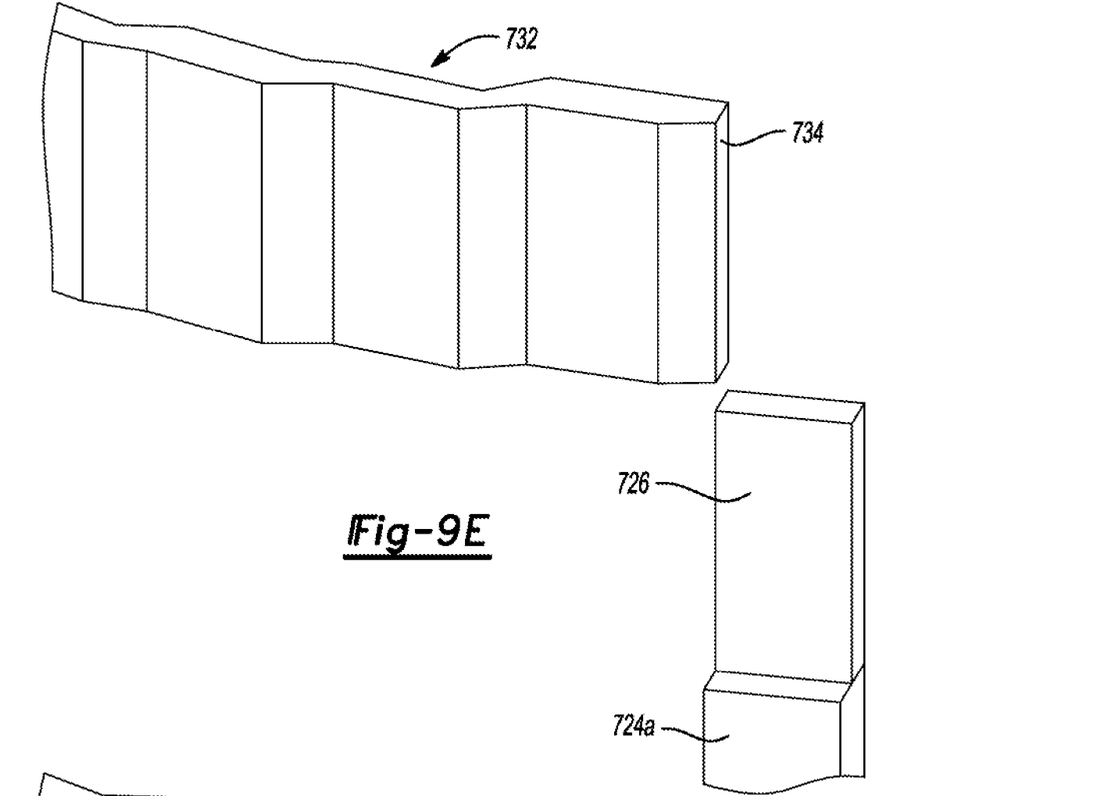
FIG. 9E is a perspective view of terminal portions of a third disclosed embodiment of a bridge and mating U-conductor prior to being connected with one another.
Figure 9F:
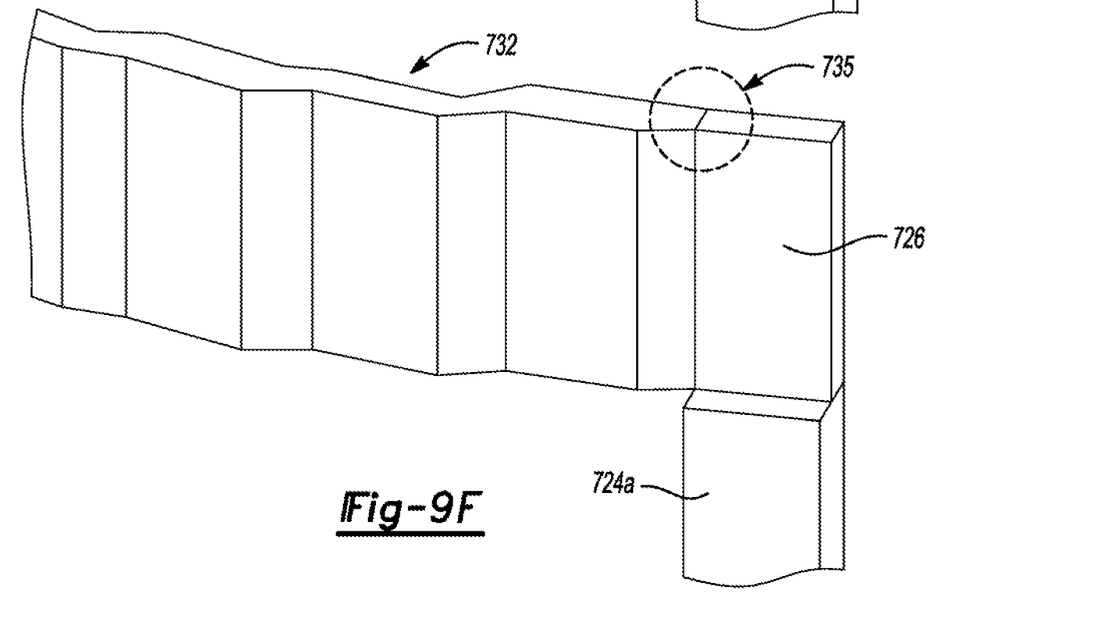
FIG. 9F is a perspective view of the terminal portions of FIG. 9E after being connected with one another.

First terminals 26a, 26b and second terminals 32a, 32b may take a variety of complementary shapes designed to minimize electrical resistance to current passing through the junction therebetween. In a first exemplary embodiment shown in FIGS. 9A-B, a first terminal 26 comprises a generally rectangular tenon and a second terminal 32a defines a mortise 34 configured to matingly receive the tenon to thereby form a mortise-and-tenon joint. In a second exemplary embodiment shown in FIGS. 9C-D, a first terminal 626 defines a groove 626a and a second terminal 632a comprises a V-shaped tongue 634 which fits into the groove to thereby form a tongue-and-groove joint 635. In a third exemplary embodiment shown in FIGS. 9E-F, a first terminal comprises a generally rectangular peg 726 and a second terminal 732a comprises a butt end 734. Butt end 734 presses against a generally flat surface of peg 726 to thereby form a butt-type joint 735.

The second assembly step may further include heating of the junctions between the mating first and second terminals, for example by laser welding, to improve the quality, durability, and reliability of the electrical connection.

As will be apparent to persons of skill in the art, additional components and/or connections (terminals, neutral connections, jumpers, etc.) needed to complete the electrical circuits formed by the windings disclosed herein may be incorporated at either axial end of the core.

FIGS. 10-17 show components of a second embodiment of a stator having three-phases and six slots-per-pole (two slots-per-pole for each phase). In this design the number of end-turns and bridges that must span the intervening slots is twice that of the three slots-per-pole design in the first embodiment described above. To achieve this, the end-turns of the U-conductors at a first end of the core and the corresponding bridges at the second end of the core are arranged in two layers: an inner layer immediately adjacent to the end surfaces of the core (substantially similar to the previously described end-turns and bridges) and an outer layer spanning over and passing axially above the inner layer.

Figure 10:
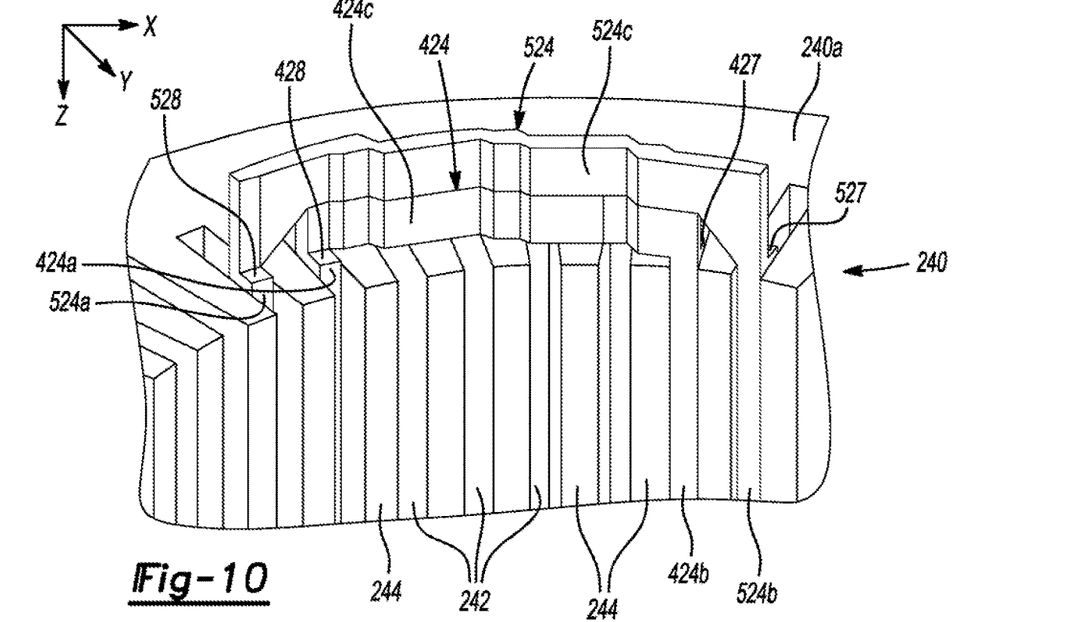
FIG. 10 is a perspective view of a representative pair of inner and outer U-conductors of a second embodiment of a first winding assembly.

FIG. 10 shows a stator core 240 along with portions of an inner U-conductor 424 and an outer U-conductor 524 (both of which belong to a common electrical phase of the electrical machine) that are components of a dual-layer first winding assembly (DL-FWA) 220. The depicted inner/outer pair of U-conductors 424, 524 depicted is representative of any such pair comprising DL-FWA 220, and the rest of the component U-conductors are not shown in FIG. 10 for clarity.

Inner U-conductor 424 comprises uprights 424a, 424b (shown disposed in respective slot 242 defined by core 240) and inner end-turn 424c connecting the uprights. Inner U-conductors 424 are substantially identical to U-conductors 24 making up FWA 20 of the first disclosed embodiment, except that end-turns 424c span four intervening slots 242 between the uprights 424a, 424b.

Outer U-conductor 524 comprises uprights 524a, 524b connected by outer end-turn 524c. As depicted in FIG. 10, uprights 424b and 524b are positioned more radially inboard than uprights 424a, 524a and therefore both inner and outer end-turns 424c, 524c step radially outward as then extend in a generally counterclockwise circumferential direction over end surface 240a. Outer end-turn 524c spans six intervening slots (two of which are occupied by inner uprights 424a-b) and extends immediately axially above and parallel with inner end-turn 424c. Outer uprights 524a-b are disposed in slots immediately adjacent to and circumferentially outboard (relative to inner end-turn 424c) of the slots containing inboard uprights 424a-b. The junctions between outer uprights 524a-b and the respective opposite ends of outer end-turn 524c form inward-facing and outward-facing ledges 528, 527 disposed even with (located at the same axial position as) the corresponding inner end-turn ledges 428, 427. This configuration allows a mutual nesting of radially-adjacent end-turns, substantially identical to that described in relation to the single-layer end-turns of the previous embodiment. In this dual-layer embodiment, the end-turns of the inner layer nest radially against one another, and the end-turns of the outer layer nest radially against one another directly above those of the inner layer. DL-FWA 220 may advantageously be fabricated by a 3D printing process, as described above.

Figure 11:
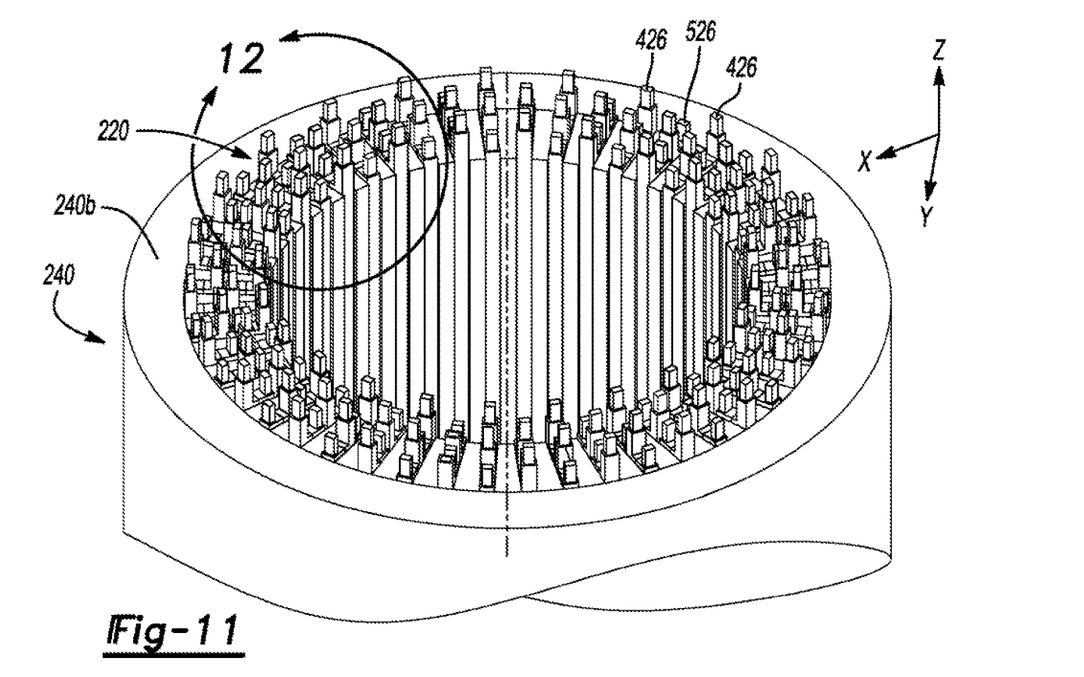
FIG. 11 is a perspective view of the first winding assembly of FIG. 10 inserted in a core.
Figure 12:
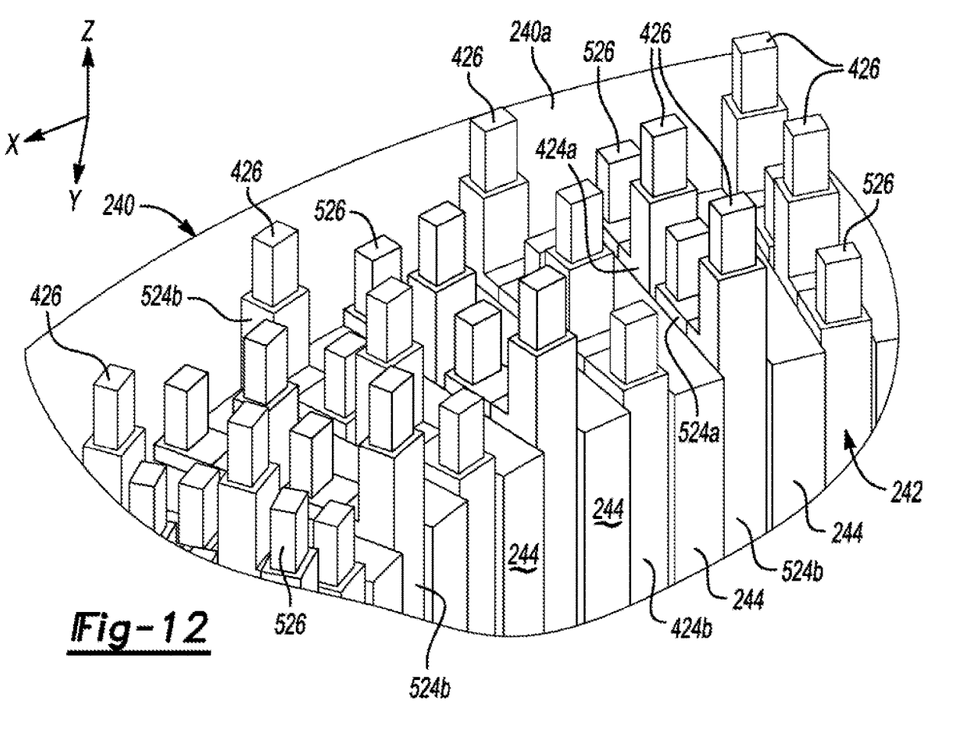
FIG. 12 is an enlarged view of the first winding assembly and core of FIG. 11.

FIGS. 11 and 12 show DL-FWA 220 fully inserted into core 240 after a first assembly step. It should be noted that the end surface 240*b* visible in FIG. 10 is the axially opposite end from end surface 240*a* shown in FIG. 11. The distal ends of outer U-conductor uprights 524*a*-*b* (distal from end-turns 524*c*) comprise terminals 526 that project a relatively short distance beyond (above, in the depicted orientation) core end surface 240*b*. The distal ends of inner uprights 424*a*, 424*b* (distal from end-turns 424*c*) comprise terminals 426 that project a relatively longer (compared with the projection distance of terminals 526) distance beyond core end surface 240*b*. In this six slots-per-pole embodiment, each slot 242 contains two inner U-conductor uprights 424*a*, 424*b* terminating in terminals 426, and further contains two outer U-conductor uprights 524*a*, 524*b* terminating in terminals 526.

A dual-layer second winding assembly (DL-SWA) 430 (FIG. 13) comprises a plurality of electrically conductive inner bridges 432 configured substantially similar to inner end-turns 424*c* (and to bridges 32 of the single layer FWA previously described) and arranged in a mutually nested relationship substantially similar to that of the ring 20*a* of the first disclosed embodiment. Inner bridges 432 are electrically insulated from one another when in the mutually nested arrangement, for example by thin dielectric coatings, as described above in relation to U-conductors 24.

Figure 13:
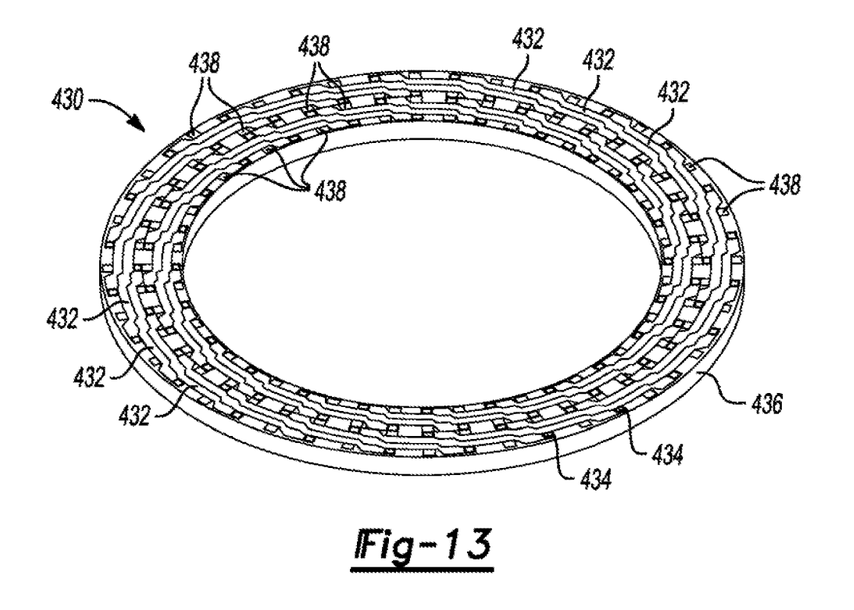
FIG. 13 is a perspective view of a second winding assembly of the second embodiment of a stator.

Opposite ends of inner bridges 432 comprise respective second terminals 432*a*, 432*b* that are configured for mating electrical connection with respective terminals 526 of the outer U-connectors. In the embodiment of FIG. 13, second terminals 432*a*, 432*b* define generally rectangular mortises 434 adapted to receive terminals 526 therein, similar to the configuration shown in FIGS. 9A-B.

DL-SWA 430 may further comprise a casing 436 partially enclosing the ring-shaped array of nested inner bridges 432. In the embodiment shown, casing 436 encloses the ring of bridges 432 on the circumferentially outer surface and on the radially inner surface thereof. As in the first embodiment disclosed herein, casing 436 is formed of an electrically non-conductive material such as epoxy and may be formed by an over-molding process after inner bridges 432 have been arranged in their ring-shaped, mutually nested relationship.

A plurality of holes or pass-throughs 438 are defined in casing 436, the pass-throughs being located in radial alignment with mortises 434. Pass-throughs 438 are thus positioned to allow terminals 426 at the distal ends of inner U-conductor uprights 424*a*, 424*b* to extend therethrough when, in a second assembly step (see FIG. 14), DL-SWA 430 is placed onto core 240 such that outer conductor first terminals 326 are placed into engagement with respective inner bridge second terminals 432*a*, 432*b*.

Figure 15:
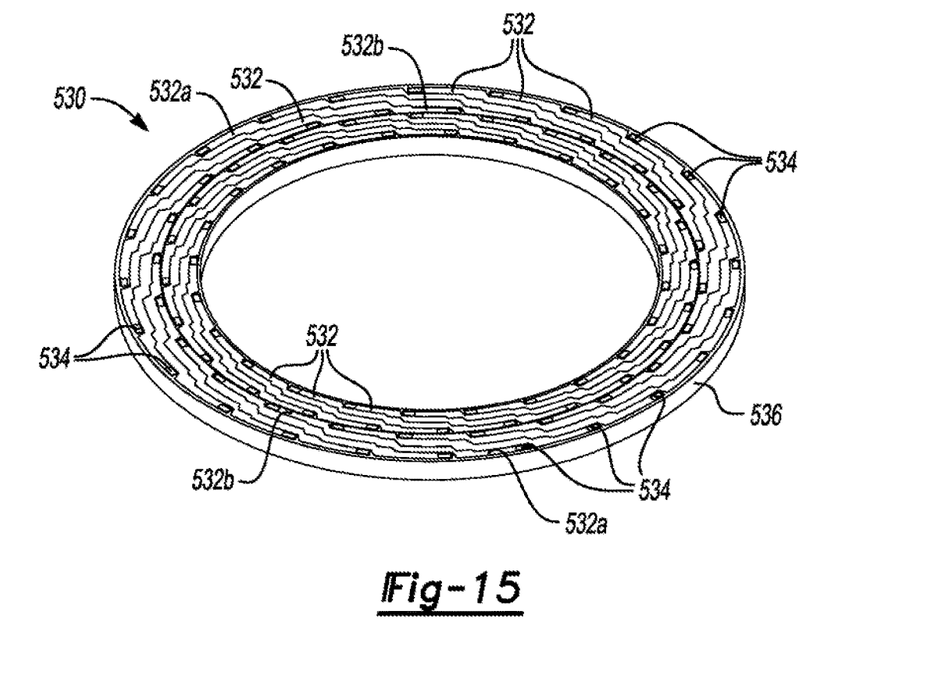
FIG. 15 is a perspective view of a third winding assembly of the second embodiment of a stator.

A third dual-layer winding assembly (DL-TWA) 530 (FIG. 15) comprises a plurality of electrically conductive outer bridges 532 configured substantially similar to outer end-turns 524*c* (and, aside from spanning a greater number of intervening slots, to inner bridges 432) and arranged in a mutually nested relationship substantially similar to that of DL-SWA 430. Outer bridges 532 are electrically insulated from one another when arrayed as shown in FIG. 15, for example by thin dielectric coatings, as described above.

Opposite ends of outer bridges 532 comprise respective second terminals 532*a*, 532*b* configured for mating physical and electrical connection with respective first terminals 426 of the inner U-connectors. In the embodiment of FIG. 15, second terminals 532*a*, 532*b* define generally rectangular mortises 534 adapted to receive terminals 426 therein.

DL-TWA 530 may further comprise a casing 536 partially enclosing the ring formed by the nested outer bridges 532. In the embodiment shown, casing 536 encloses the ring of nested bridges 532 on the circumferentially outer surface and on the radially inner surface thereof. Similar to the first embodiment disclosed herein, casing 536 is formed of an electrically non-conductive material such as epoxy and may be formed by an over-molding process after outer bridges 532 have been arranged in their ring-shaped, mutually nested relationship.

Figure 14:
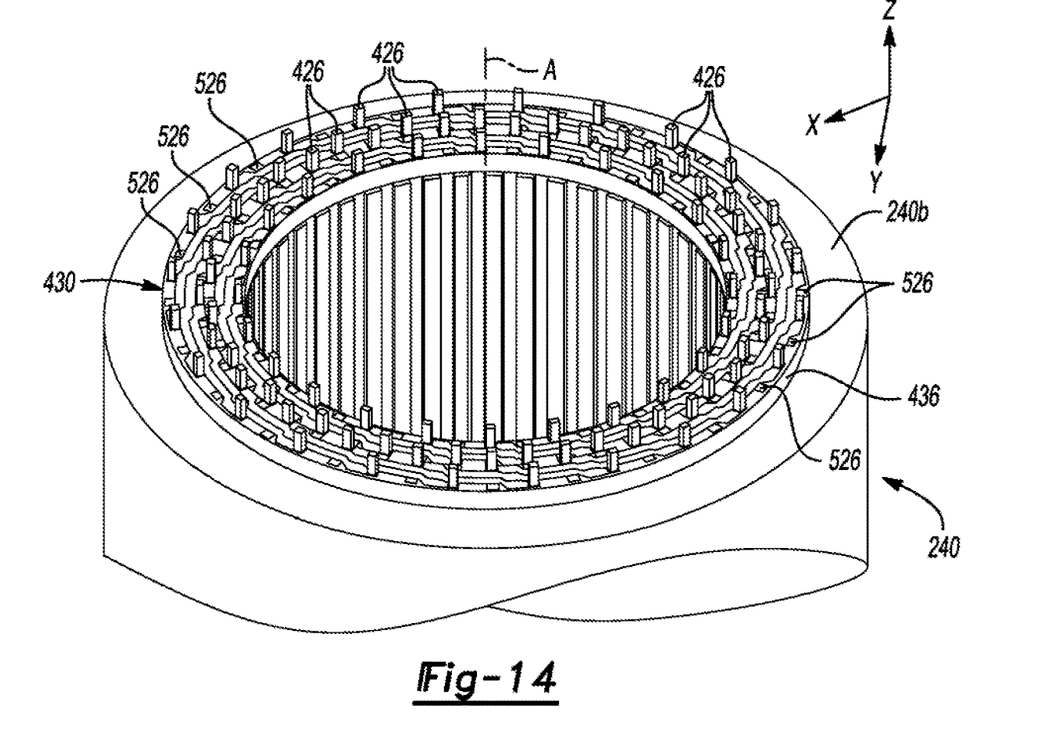
FIG. 14 is a perspective view of the second winding assembly of FIG. 12 assembled with first winding assembly and core of FIG. 11.
Figure 16:
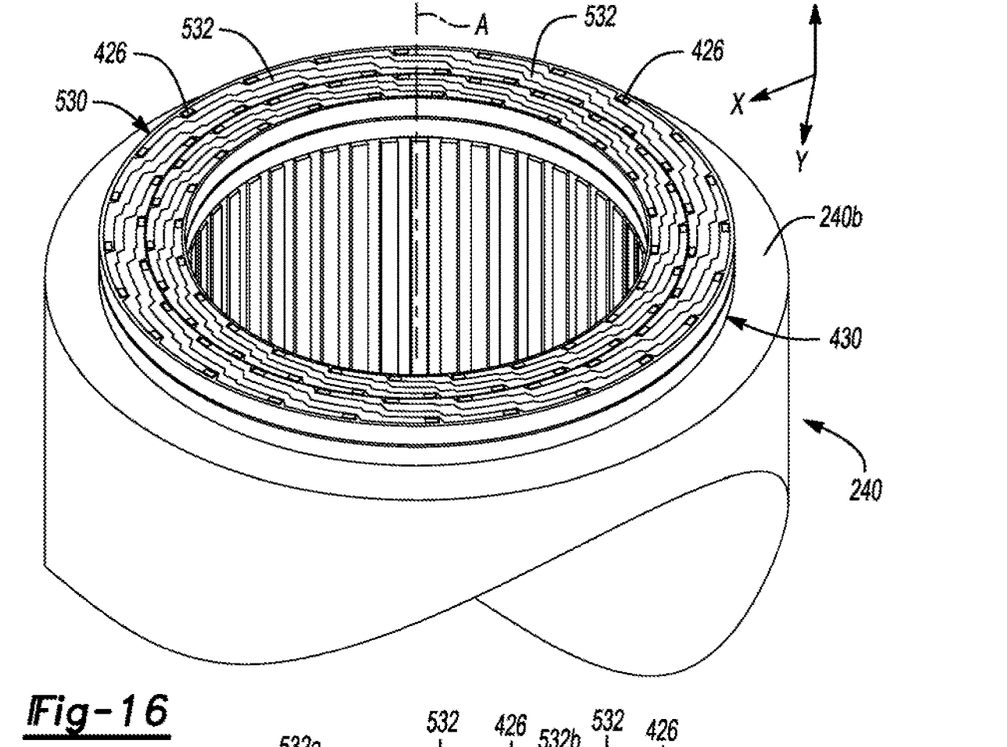
FIG. 16 is a perspective view of the third winding assembly of FIG. 15 assembled with the components of FIG. 14.
Figure 17:
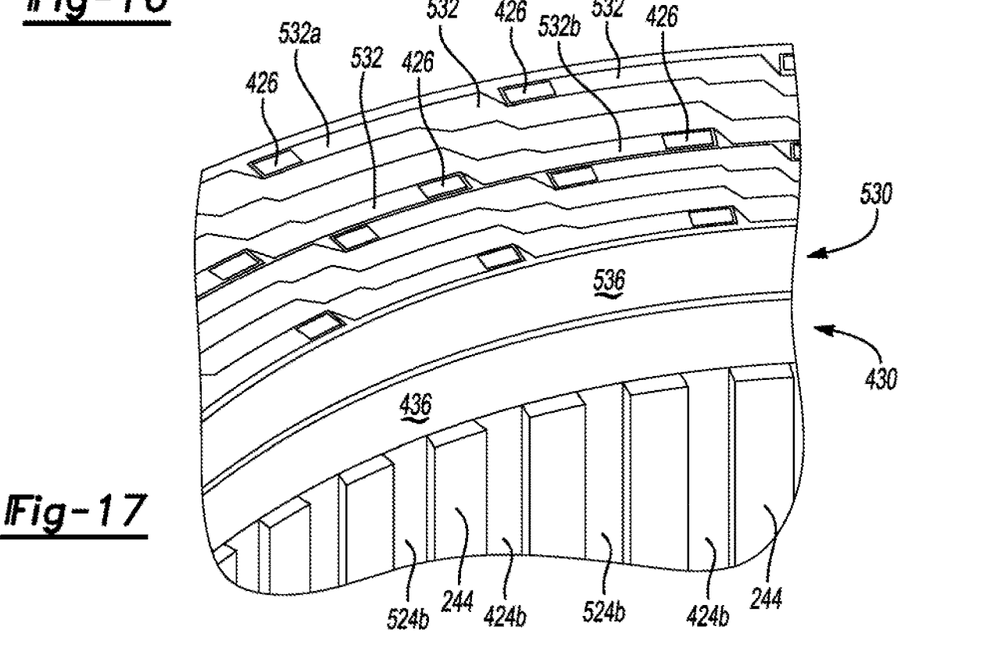
FIG. 17 is a is an enlarged view of a portion of FIG. 16.

In a third assembly step, DL-TWA 530 is placed in axial alignment with the core/DL-FWA/DL-SWA combination of FIG. 14 and moved relative thereto along axis A so that terminals 532*a*, 532*b* at opposite ends of outer bridges 532 are placed in engagement with respective inner U-connector terminals 426 (FIG. 16). As best shown in FIG. 17, only the tips of inner U-connector terminals 426 are visible when engaged with their respective bridge terminals 532*a*, 532*b*. Inner and outer casings 436, 536 are thus in an axially stacked relationship with one another and the circuits formed by the stator windings are completed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A stator for an electric machine comprising:
   a core defining a plurality of slots extending parallel to a longitudinal axis of the core;
   stratified layers arranged to form a first winding assembly comprising a plurality of U-shaped conductors each comprising first and second uprights disposed in a different one of the slots, and the first winding assembly further comprising a plurality of end-turns connecting respective pairs of the first and second uprights and disposed adjacent to a first end surface of the core, ends of the uprights distal from the end-turns defining first terminals projecting axially beyond a second end surface of the core; and
   a second winding assembly comprising a plurality of bridges, each having opposite ends defining second terminals configured for mating engagement with respective first terminals, one of the first and second terminals being inserted into an other of the first and second terminals, wherein at least one of the first terminals defines a groove and the respective one of the second terminals engaged therewith comprises a tongue such that the bridges are coupled to respective uprights by a tongue-and-groove joint.

2. The stator of claim 1, wherein the plurality of bridges is disposed in a ring and the second winding assembly further comprises an electrically non-conductive casing enclosing the ring on a circumferentially outer surface thereof and on a radially inner surface thereof.

3. The stator of claim 1, wherein at least one of the first terminals comprises a tenon and the respective one of the second terminals engaged therewith comprises a mortise such that at least one of the bridges is coupled to respective upright by a mortise-and-tenon joint.

4. The stator of claim 1, wherein at least one of the first terminals comprises a peg and the respective mating one of the second terminals comprises a butt such that the bridges are coupled to respective uprights by a butt-type joint.

5. The stator of claim 1, wherein:
the first winding assembly further comprises a plurality of U-shaped outer conductors each comprising a third upright disposed in a third of the slots, a fourth upright disposed in a fourth of the slots, and an outer end-turn connecting the third and fourth uprights and extending axially over and spanning the end-turn of a one of the conductors, ends of the third and fourth uprights distal from the outer end-turns defining third terminals; and
the stator further comprises a third winding assembly comprising a plurality of inner bridges and disposed axially between the core and the second winding assembly such that each of the bridges extends axially over and spans a respective one of the inner bridges, each of the inner bridges having opposite ends defining fourth terminals configured for mating engagement with respective third terminals, one of the third and fourth terminals being inserted into an other of the third and fourth terminals, and the third winding assembly defining a plurality of holes through which respective ones of the first and second uprights extend.

6. The stator of claim 5, wherein the plurality of inner bridges is disposed in a ring and the third winding assembly further comprises an electrically non-conductive casing enclosing the ring on a circumferentially outer surface thereof and on a radially inner surface thereof.

7. The stator of claim 5, wherein the third upright is radially closer to the longitudinal axis than the fourth upright, and radially adjacent outer end-turns are disposed in radially-nested relationship with one another without crossing over one another.

8. The stator of claim 5, wherein at least one of the third terminals comprises a tenon and the respective one of the fourth terminals engaged therewith comprises a mortise such that at least one of the inner bridges is coupled to the respective upright by a mortise-and-tenon joint.

9. The stator of claim 5, wherein at least one of the third terminals defines a groove and the respective one of the fourth terminals engaged therewith comprises a tongue such that the inner bridges are coupled to the respective uprights by a tongue-and-groove joint.

10. A stator for an electric machine comprising:
a core defining a plurality of slots extending parallel to a longitudinal axis of the core;
stratified layers arranged to form a first winding assembly comprising a plurality of U-shaped conductors having respective end-turns arranged in mutually radially-nested relationship to each other to form a ring, each U-conductor further comprising a first and a second upright disposed in a different one of the slots, and the first winding assembly further comprising a plurality of end-turns connecting respective pairs of the first and second uprights and disposed adjacent to a first end surface of the core, ends of the uprights distal from the end-turns defining first terminals projecting axially beyond a second end surface of the core; and
a second winding assembly comprising a plurality of bridges arranged in mutually radially-nested relationship to each other to form a second ring, opposite ends of each bridge defining second terminals configured for mating engagement with respective first terminals, and the second winding assembly further comprising an electrically non-conductive casing, at least one of the plurality of bridges embedded in the casing, the casing disposed adjacent to the second end surface of the core with the second terminals engaging the respective first terminals.

11. The stator of claim 10, wherein the casing encloses the second ring on a circumferentially outer surface thereof and on a radially inner surface thereof.

12. The stator of claim 10, wherein at least one of the first terminals comprises a tenon and the respective one of the second terminals engaged therewith comprises a mortise such that at least one of the bridges is coupled to respective upright by a mortise-and-tenon joint.

13. The stator of claim 10, wherein at least one of the first terminals defines a groove and the respective one of the second terminals engaged therewith comprises a tongue such that the bridges are coupled to respective uprights by a tongue-and-groove joint.

14. The stator of claim 10, wherein:
the first winding assembly further comprises a plurality of U-shaped outer conductors each comprising a third upright disposed in a third of the slots, a fourth upright disposed in a fourth of the slots, and an outer end-turn connecting the third and fourth uprights and disposed in a ring-shaped, mutually radially-nested radially with one another, and ends of the third and fourth uprights distal from the outer end-turns defining third terminals; and
the stator further comprises a third winding assembly comprising a plurality of inner bridges disposed in a third ring partially enclosed in an electrically non-conductive casing, the third winding assembly disposed axially between the second end surface of the core and the second winding assembly such that each of the bridges extends axially over and spans a respective one of the inner bridges, each of the inner bridges having opposite ends defining fourth terminals configured for mating engagement with respective third terminals, one of the third and fourth terminals being inserted into an other of the third and fourth terminals, and the third winding assembly defining a plurality of holes through which respective ones of the first and second uprights extend.

* * * * *